United States Patent [19]
Sugishima

[11] Patent Number: 5,844,590
[45] Date of Patent: Dec. 1, 1998

[54] IMAGE PRINTING METHOD AND APPARATUS FOR PRINTING AN IMAGE BASED ON STORED AND INPUT IMAGE DATA, INCLUDING ELECTIVE PRINTING IN AN OVERLAPPED DATA AREA

[75] Inventor: Kiyohisa Sugishima, Yokohama, Japan

[73] Assignee: Canon Kabushiki Kaisha, Tokyo, Japan

[21] Appl. No.: 132,196

[22] Filed: Oct. 6, 1993

[30] Foreign Application Priority Data

Oct. 13, 1992 [JP] Japan .................................... 4-274123

[51] Int. Cl.⁶ ........................................................ B41J 2/47
[52] U.S. Cl. ............................................................ 347/142
[58] Field of Search .................................. 347/142, 132, 347/131, 237, 247, 232, 234, 15, 24; 358/298, 296, 300, 302

[56] References Cited

U.S. PATENT DOCUMENTS

| | | | |
|---|---|---|---|
| 3,842,195 | 10/1974 | Takahashi et al. ...................... | 347/232 |
| 4,313,124 | 1/1982 | Hara . | |
| 4,345,265 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,561,025 | 12/1985 | Tsuzuki ..................................... | 347/15 |
| 4,608,577 | 8/1986 | Hori . | |
| 4,661,703 | 4/1987 | Ishikawa et al. ........................ | 347/232 |
| 4,723,129 | 2/1988 | Endo et al. . | |
| 4,740,796 | 4/1988 | Endo et al. . | |
| 4,872,025 | 10/1989 | Sekiya et al. ........................... | 347/254 |
| 4,933,773 | 6/1990 | Shiota et al. ............................ | 347/232 |
| 4,958,233 | 9/1990 | Okino ..................................... | 347/232 |
| 4,967,203 | 10/1990 | Doan et al. . | |
| 4,999,646 | 3/1991 | Trask . | |
| 5,003,382 | 3/1991 | Omi et al. .............................. | 358/530 |
| 5,043,824 | 8/1991 | Suzuki ................................... | 347/232 |
| 5,381,165 | 1/1995 | Lofthus et al. ......................... | 347/232 |
| 5,440,399 | 8/1995 | Lee ........................................ | 347/232 |
| 5,495,271 | 2/1996 | Koitabashi et al. ..................... | 347/24 |

FOREIGN PATENT DOCUMENTS

| | | |
|---|---|---|
| 0235398 | 9/1987 | European Pat. Off. . |
| 0508123 | 10/1992 | European Pat. Off. . |
| 2542540 | 9/1984 | France . |
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—Mark J. Reinhart
*Attorney, Agent, or Firm*—Fitzpatrick, Cella, Harper & Scinto

[57] ABSTRACT

An image printing method and apparatus for combining and printing image data that has already been stored with the image of a read original. The stored image data is printed at a prescribed density, and the image of the original is printed at a density conforming to the gray level thereof. At a portion of a recording medium on which the stored image data and the image of the original will overlap, the stored image data is printed preferentially. Further, the printing of the image and the scanning of the original image for reading the same are executed synchronously.

14 Claims, 5 Drawing Sheets

IMAGE PRINTING METHOD AND APPARATUS FOR PRINTING AN IMAGE BASED ON STORED AND INPUT IMAGE DATA, INCLUDING ELECTIVE PRINTING IN AN OVERLAPPED DATA AREA

BACKGROUND OF THE INVENTION

1. Field of the Invention

This invention relates to an image printing method and apparatus for printing multivalued image data by a printing head having a plurality of printing elements (nozzles or heating elements, etc.).

2. Description of the Related Art

In an ink-jet printer known in the art, an ink-jet head having a plurality of nozzles arranged in a sub-scan direction is mounted on a carriage and the carriage is made to scan in a main-scan direction to perform printing. When printing is performed using an ink-jet head, images on a plurality of lines are capable of being formed simultaneously on a recording medium such as recording paper by a single scan of the carriage. A copier known in the art is equipped with such an ink-jet head and is capable of printing the image of an original in full color.

When it is desired to print a plurality of images in superimposed form using such a copier, it is required that a first image of an original be initially copied and that the paper on which the copy has been made be set in a copier as recording paper. Next, it is required that a second image of an original desired to be copied on the first original image in superimposed form be set in the copier, and that this second original image be copied so as to copy onto the first original image. This is a very troublesome operation.

SUMMARY OF THE INVENTION

An object of the present invention is to provide an image printing method and apparatus through which a plurality of images can be printed in superimposed form by means of a simple operation.

Another object of the present invention is to provide an image printing method and apparatus through which already entered image data and the image of an original can be combined and printed.

A further object of the present invention is to provide an image printing method and apparatus through which already entered image data and the image of an original are capable of being distinguished, combined and printed.

A further object of the present invention is to provide an image printing method and apparatus through which a plurality of images of originals can be combined and printed.

A further object of the present invention is to provide an image printing method and apparatus through which a plurality of images of originals can be combined and printed in multiple gray levels.

According to the present invention, the foregoing objects are attained by providing an image printing apparatus for printing an image by a printing head having a plurality of printing elements, comprising memory means for storing image data, input means for inputting original-image data indicative of an original, output means for changing over between the image data from the memory means and the original-image data and outputting the image data, to which the changeover has been made, to the printing head as printing image data, and printing means for performing printing based upon the image data outputted by the output means, the printing means printing the image data from the memory means at a prescribed density and printing the original-image data in multiple gray levels conforming to the gray levels of this original-image data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described in detail with reference to the accompanying drawings.

Figure 1:
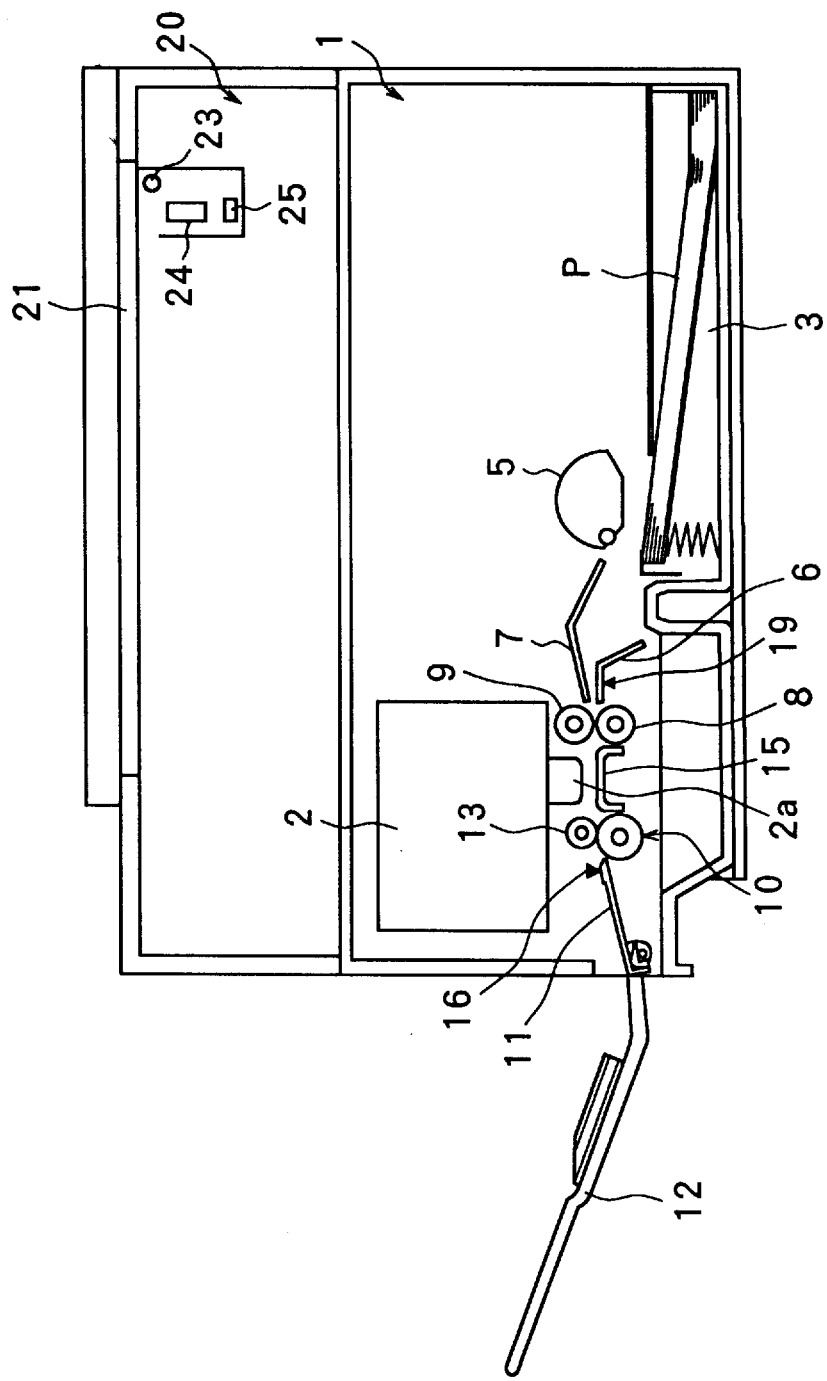
FIG. 1 is a structural sectional view illustrating the internal structure of a copier embodying the present invention.

FIG. 1 is a structural sectional view illustrating the internal structure of a full-color copier using an ink-jet printer according to an embodiment of the present invention.

The full-color copier of this embodiment comprises a reader 20 (hereinafter referred to as a scanner) for reading an original, and a printing unit 1 for printing the image of the original on a recording medium such as recording paper. In the scanner 20, the original placed upon a glass platen 21 is illuminated by an illuminating lamp 23, and light reflected from the original is imaged upon a photoelectric transducer (a reading sensor) 25 via a lens 24. The photoelectric transducer 25 generates an electric signal based upon the image of the original incident thereon, and information indicative of the original image can be obtained based upon this electric signal. The photoelectric transducer 25 is caused to scan in the main-scan direction owing to rotation of a main-scan motor 416 (see FIG. 4) and is moved from left to right (in the sub-scan direction) below the original owing to rotation of a sub-scan motor 417 (FIG. 4), whereby the image of the original is scanned in successive fashion.

Furthermore, the photoelectric transducer 25 is composed of a row of micro elements to respective ones of which R, G and B filters are attached. Thus, an image signal representing one pixel is generated by three elements. The density of these elements is 400 elements per inch, and the total number of elements is that for 144 pixels, that is, 432 for three colors R, G and B. After making one round trip in the left-right direction as seen in the drawing, the photoelectric transducer 25 is moved by the width of one read (printed) pixel inward in FIG. 1 so that the next line of the original image is read. An image signal for the entire original is obtained by repeating this operation a number of times conforming to the size of the original. The image signal obtained by the photoelectric transducer 25 is subjected to image processing such as a color correction, a luminance-density conversion and then a density correction, after which the signal is sent to the printing head of the printing unit 1 as a four-value signal for each of the colors cyan (C), magenta (M), yellow (Y) and black (K), which are the colors of the inks used in the printer.

The four-value data corresponding to each color of the ink in the printer is set to "0" for a density of "0" to "63", "1" for a density of "64" to "127", "2" for a density of "128" to "191" and "3" for a density of "192" to "255". A printing head 2a of this embodiment is a multivalued head that forms one pixel by jetting ink three times. In other words, no ink is jetted when the image data is "0", ink is jetted once when the image data is "1", twice when the image data is "2" and three times when the image data is "3", whereby the image of one pixel is formed.

In the printing unit 1, recording paper P is fed from a paper cassette 3 by a paper-feed roller 5 and reaches conveyor rollers 8, 9 through a paper-feed sensor 19 and paper-feed guides 6, 7. The recording paper conveyed by the conveyor rollers 8, 9 reaches the platen 15. On the basis of the image information from the scanning unit 20, ink within an ink tank 2 is jetted from nozzles onto the recording paper, which has been conveyed to the platen 15, by means of the printing head 2a, whereby an image conforming to the image of the original is formed. The printing head 2a has a row of 128 nozzles arranged in a direction perpendicular to the scanning direction of the printing head 2a and is capable of printing an image by a single scan of the printing head 2a. That is, the printing head 2a performs printing, while being made to scan inward in FIG. 1, in synchronism with the reading operation of the photoelectric transducer 25 of the scanning unit 1. One band (a width of about 8 mm) of an image thus is formed on the recording paper.

When the printing of one band of the image ends, the recording paper is conveyed by an amount equivalent to one band by conveyor rollers 8, 9, 10, 13 in order to prepare for printing of the next band. When the printing of one page of the original ends, the recording paper on which printing has been completed is discharged into a paper-discharge tray 12 through a conveyance path 11. Numeral 16 denotes a paper-discharge sensor for sensing whether or not the recording paper is in the conveyance path 11.

Figure 2:
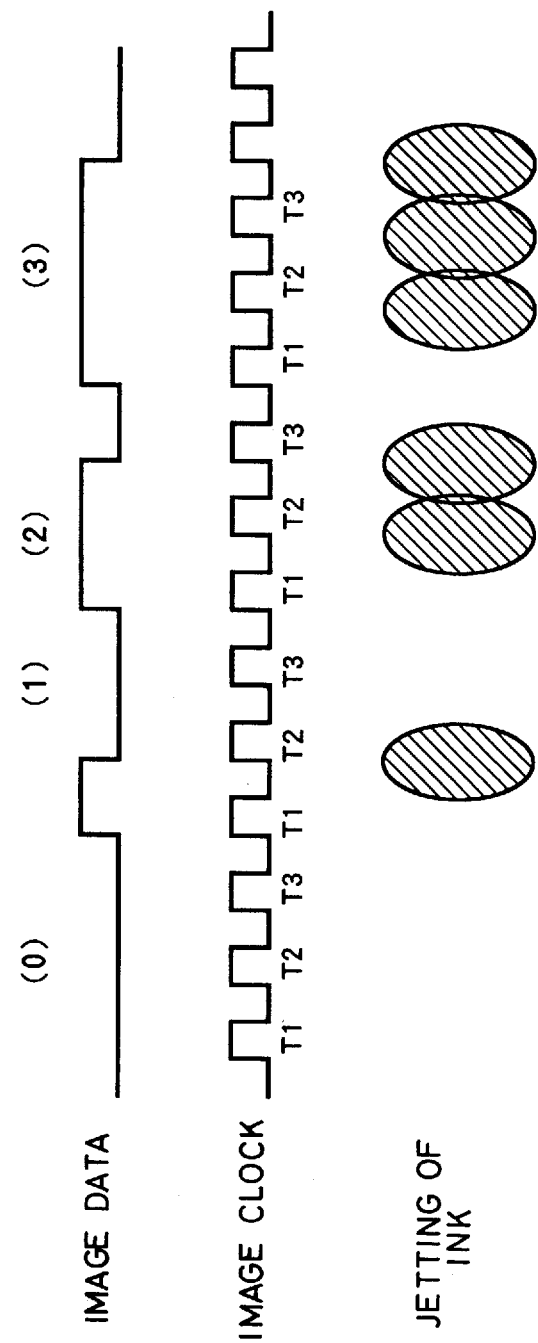
FIG. 2 is a schematic view illustrating the printing timing of one pixel in the copier of this embodiment.

FIG. 2 is a diagram schematically illustrating the jetting of ink by the printing head (ink-jet head) 2a in the full-color copier of this embodiment.

The image data applied to the printing head 2a is image data, which is composed of eight bits, converted into four-value data comprising values "0", "1", "2", "3", as mentioned above. In other words, in conformity with the four-value data, the pulse width of the image data is lengthened and image clock pulses (T1~T3), the number of which corresponds to the four-value data, are outputted during the application of the image data, as shown in FIG. 2. Accordingly, in the printing head 2a, the value of the four-value data is detected a number of times equivalent to the number of image clock pulses that prevail during the time that the image data is at the high level. If the image clock signal is at the high level at a detection of the value of the four-value data, the printing head 2a discharges ink from a nozzle. As a result, ink is jetted only once at the clock timing T1 if the image data is "1", twice at the clock timings T1, T2 if the image data is "2", and three times at the clock timings T1, T2, T3 if the image data is "3". Thus, the printing head corresponding to each color jets the respective ink to form one pixel.

Figure 3:
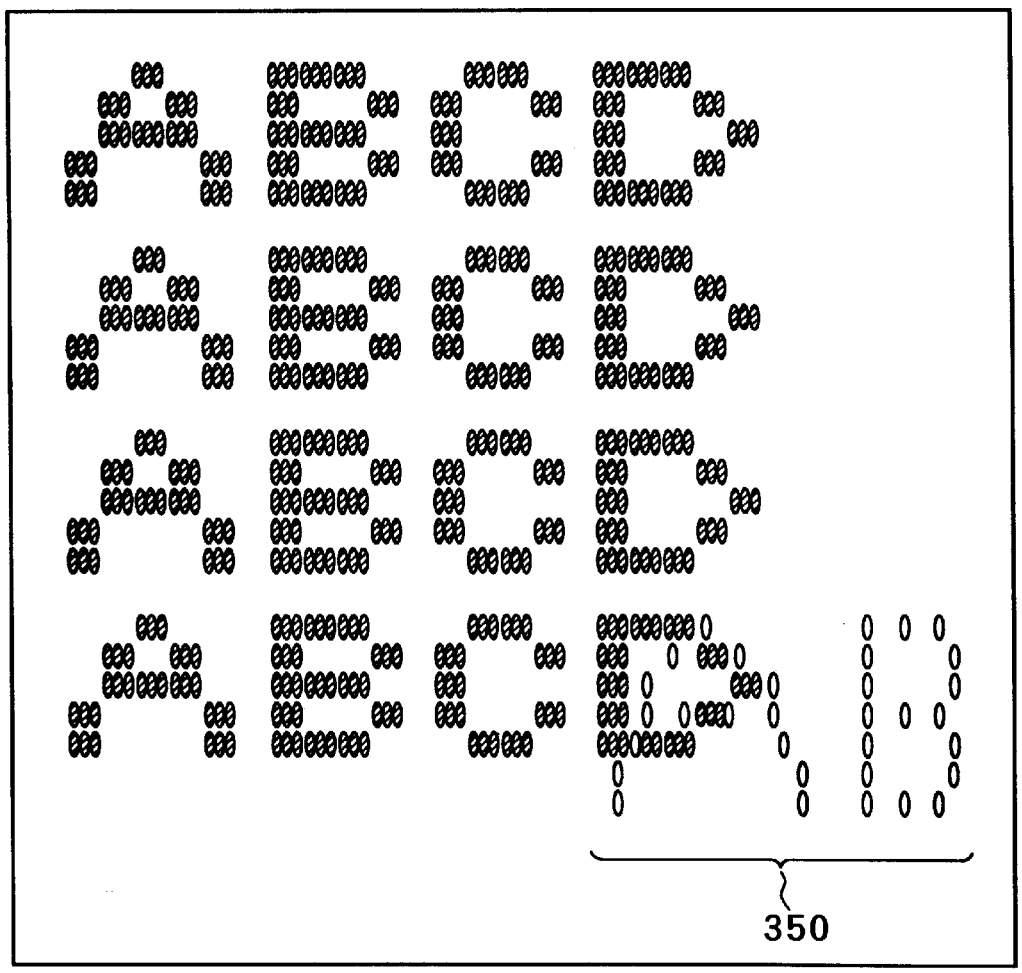
FIG. 3 is a schematic view illustrating an example of a watermarking output in the copier of this embodiment.

FIG. 3 is a diagram showing an example of printing in the full-color copier of this embodiment.

A character string "ABCD" printed in the form of black dots in FIG. 3 indicates image data representing the image of an original, and a character string "AB" (denoted at 350) represented by white dots indicates the results of printing based upon image data that has been stored in an image memory 305 (see FIG. 4) in advance.

In order to print a combined image, first the copying of the image of the original is commanded, whereupon the image data (for example, the white dots in FIG. 3) stored in the image memory 305 of the copier is given priority and printed. In a case where image data has not been stored in the image memory 305, only the read image of the original is printed. In other words, as shown in FIG. 2, ink is jetted in synchronism with the first image clock pulse that prevails when the pulse signal representing the image data is at the high level, then ink is jetted in conformity with the particular pulse width of the image data at the subsequent second and third image clock pulses. Thus, an image is printed in conformity with the density of the original image. It should be noted that the image data that has been stored in the image memory 305 is printed only at the timing of the first image clock pulse in this embodiment and, therefore, this data is printed more thinly (more lightly) than the image of the original. In this example, a dot (pixel) at a portion where the dot position of the original-image data which has been converted into the four-value data, will be overlapped by a dot position of the image stored in the image memory 305, is printed according to the image data in the image memory 305, to be printed lightly, as a result.

Figure 4:
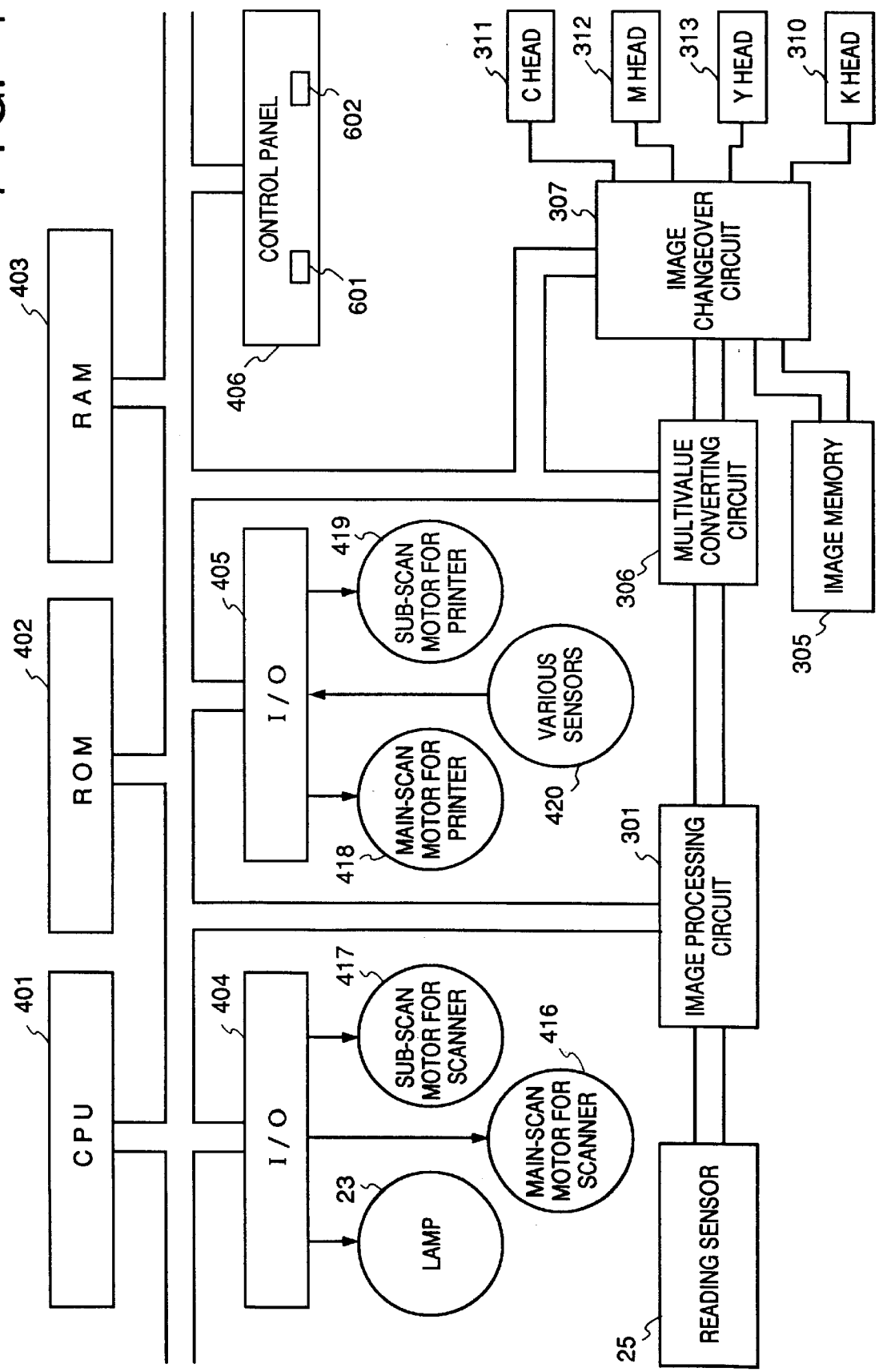
FIG. 4 is a block diagram schematically showing the construction of the copier in this embodiment.

FIG. 4 is a block diagram illustrating the general construction of the full-color copier of this embodiment.

Figure 5:
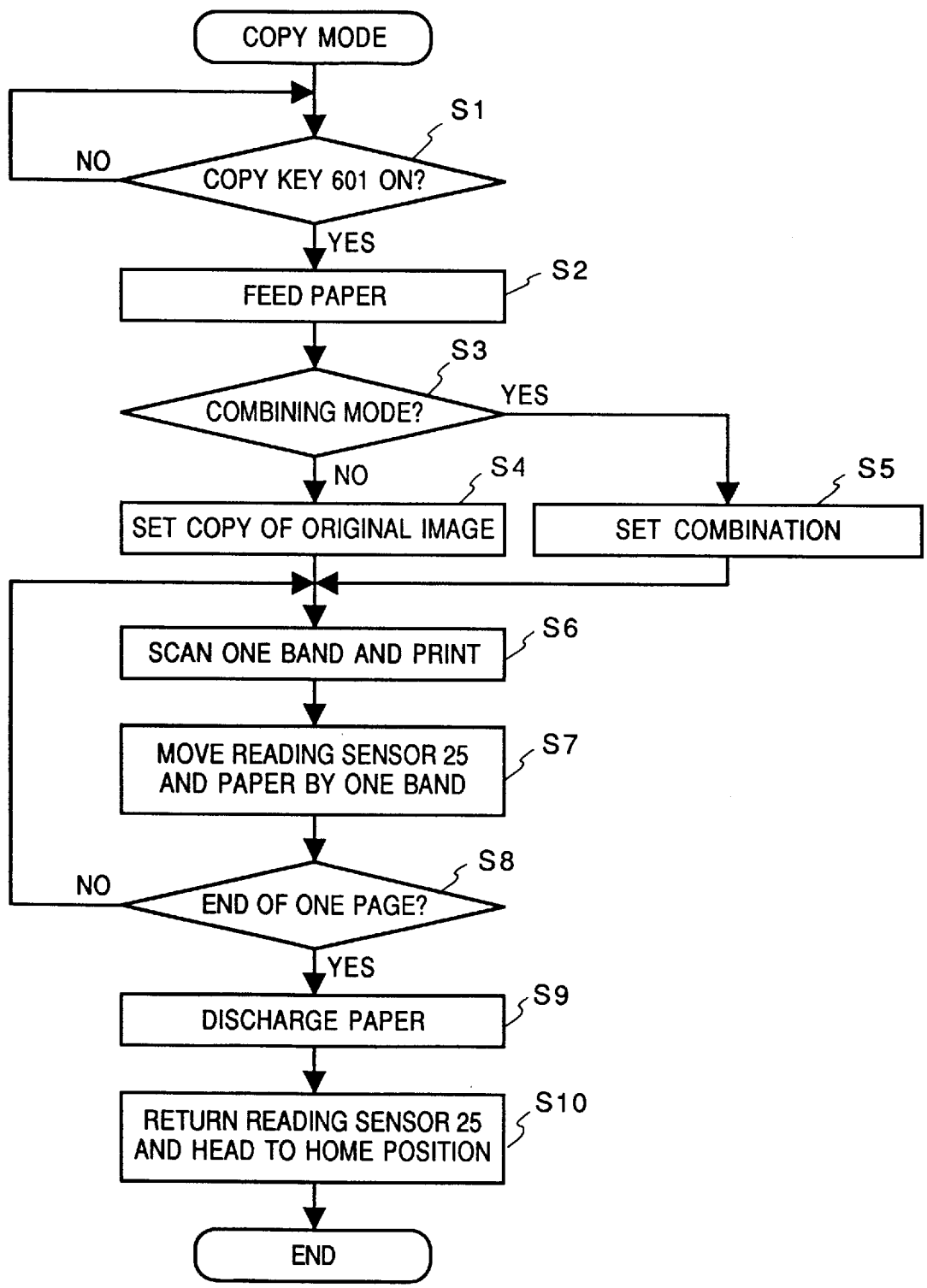
FIG. 5 is a flowchart illustrating copy processing in the copier of this embodiment.

A CPU 401 executes various control operations based upon a control program stored in a ROM 402 and illustrated in the flowchart of FIG. 5. A RAM 403 stores various working data that accompanies the operation of the CPU 401. A control panel 406 has a copy starting key 601 for commanding the start of copying, various keys for setting a variety of functions, such as a mode key 602 for designating a combining mode, and a display for presenting a variety of messages to be viewed by the operator.

Input/output circuits I/O 404, I/O 405 control respective drive sections. The illumination lamp 23 of the scanning unit 20 and the main-scan and sub-scan motors 416, 417 for moving the reading sensor 25 are connected to the I/O port 404. These input/output circuits are controlled by the CPU 401. A main-scan motor 418 for moving the printing head of the printing unit 20, a sub-scan motor 419 for moving the recording paper, and various sensors 420 such as the paper-discharge sensor 16 and a paper-feed sensor 19 are connected to the I/O port 405. Motor-drive signals from the CPU 401 are outputted to the corresponding motors, and signals from the various sensors are outputted to the bus of the CPU 401.

The bus is further connected to an image processing circuit 301, which executes various processing such as a density-luminance conversion and undercolor removal, as well as to a multivalue converting circuit 306. The circuits also operate under the control of the CPU 401. The reading sensor 25 outputs RGB signals each composed of eight bits. These image signal, are applied to the image processing circuit 301, which subjects the signals to a logarithmic conversion, namely the luminance-density conversion, masking processing for a color correction, black generation for producing a distinct black color and processing for zooming, etc. As a result of these processing operations, the signals are converted into eight-bit CMYK signals for the colors C (cyan), M (magenta), Y (yellow) and K (black), respectively. The CMYK signals are converted into four-bit data by the multivalue converting circuit 306, as described above, after which the resulting signals are outputted to respective ones of ink-jet heads 310~313 corresponding to these four colors via an image changeover circuit 307. Each ink-jet head jets ink conforming to the image signal, thereby performing printing.

Furthermore, the image changeover circuit 307 is also connected also to the image memory 305. The image changeover circuit 307 changes over between outputting the image data from the reading sensor 25 and the image data from the image memory 305 to the ink-jet heads 310~313. With the head of this embodiment, one pixel is formed by jetting ink a maximum of three times. The image changeover circuit 307 is so constructed as to be capable of switching between the aforementioned data each of the three times that ink is jetted.

FIG. 5 is a flowchart illustrating a copying operation performed by the full-color copier of this embodiment. The control program for executing this processing is stored in the ROM 402.

First, at step Si, it is determined whether the copy starting key 601 on the control panel 406 has been pressed to command the starting of the copying operation. If the key 601 has been pressed, the program proceeds to step S2, at which the recording paper P is fed into the apparatus from the paper cassette 3. Thus, when the sensor 19 senses that the recording paper has reached the position of the platen 15 owing to rotation of the conveyor rollers 8, 9, the program proceeds to step S3. Here it is determined whether the image combining mode has been designated, namely whether the combining mode switch 602 has been pressed on the control panel 406. The image changeover circuit 307 is set to the combining mode depending upon the status of the mode key 602.

The operation of the image changeover circuit 307 when the combining mode is set will now be described, as well as the image recorded at such time.

As mentioned above, the ink-jet head of this embodiment forms one pixel by jetting ink a maximum of three times. The image changeover circuit 37 is capable of changing over between the image data from the reading sensor 25 and the image data stored in the image memory 605 only at the initial jetting operation of the three jetting operations, or in other words, only with regard to the initial clock timing (indicated at T1 in FIG. 2) of the image clock. When there is image data in the image memory 305, the image changeover circuit 307 gives priority to the data from the image memory 305 and outputs this data to the ink-jet heads 310~313. When there is no image data in the image memory 305, the image changeover circuit 307 outputs the image data from the reading sensor 25 to the ink-jet heads 310~313. At the timing instants indicated at T2, T3 in FIG. 2, the image data from the reading sensor 25 is outputted to the ink-jet heads 310~313. The data changeover performed by the image changeover circuit 305 is executed for every dot.

If the combining mode has been set at step S5, the image changeover circuit 307 outputs the image data from the image memory 305 to the ink-jet heads 310~313 at the initial clock timing (T1 in FIG. 2) of the image clock if the image data in the image memory 305 has a dot to be printed at the time of printing at step S6, described below. If the image data in the memory 305 does not have a dot to be printed, the image changeover circuit 307 outputs a dot of the original image to the ink-jet heads 310~313. If there is a location at which a corresponding dot of the image memory 305 has been printed, the changeover circuit 307 operates in such a manner that the output of image data from the image of the original is inhibited at the timings T2, T3 in FIG. 2. As a consequence, it is possible to prevent a situation in which a dot of the original image is printed in a form superimposed on an earlier printed dot of the image from the image memory 305, as a result of which the dot of the image from the image memory would no longer be visible. Such a control of the image data can be dealt with by outputting image data, which is obtained by taking the OR between the image data of the original and the image data from the image memory 305, to the ink-jet heads 310~313 at the first clock timing T1, for example, and outputting image data, which is obtained by taking the AND between the image data of the original and the complement of the image data in the image memory 305, to the ink-jet heads 310~313 at the second and third clock timings T2, T3.

The image data that has been stored in the image memory 305 may be original-image data read by the scanning unit 20 or image data received through a communication line or the like, not shown.

Thus, the program proceeds to step S6. Here the image of the original is read and, if the combining mode is in effect, image printing is performed upon carrying out, in synchronism with the reading operation, the above-described logical operation between the image data in image memory 305 and image data of the read original. Since image processing such as shading of the original-image signal is completed in the scanning unit 20 when recording paper has been fed to the printing unit 1, the reading of the image of the original and the printing processing by the ink-jet heads 310~313 are capable of being performed while synchronization is achieved between the scanning unit 20 and the printing unit 1. Thus, copy processing comprising the reading of one band of the original and printing processing can be carried out.

When copy processing for one band is thus concluded, the program proceeds to step S7. Here the recording paper and the reading sensor 25 are each moved by an amount equivalent to 128 pixels (the printing width of an ink-jet head). Next, the program proceeds to step S8, at which it is determined, based upon sensing of the trailing edge of the recording paper and the size of the reading area of the scanning unit 20, whether the copy processing for one page of the original has been concluded. If the copy processing for one page has not been concluded, the program returns to step S6, where reading of the original and the printing operation by the printing unit 1 are repeated until copying ends.

When the copying of one page ends at step S8, the program proceeds to step S9, at which the recording paper that has been printed on is discharged from the copier. Then, at step S10, the reading sensor 25 and the ink-jet heads 310~313 are returned to their home positions and copy processing is terminated.

As described above, the image data in the image memory 305 is recorded only at the first image clock T1. The image data is recorded upon being combined with the low-density image in a multivalued image, and thus a combined image of a so-called water type is recorded.

In the above-described embodiment, only one of a maximum of three ink-jetting operations for printing one pixel is used in printing the image data from the image memory 305. However, the image from the image memory 305 may be printed by jetting ink the maximum of three times. In such a case, an arrangement can be adopted in which a command is entered to give priority to the printing of either image with regard to portions at which dots overlap. When such an order of priority is set, the image changeover circuit 307 performs control in such a manner that only the image having the higher priority is outputted to the ink-jet heads 310–313, if a portion having overlapping dots is detected.

Further, the output timing of the combined image was only described at the first clock timing T1, but the output timing may be at the timing T2 or T3.

An arrangement may be adopted in which the output timings of images to be combined are selected randomly from the clocks T1, T2 and T3. Alternatively, an arrangement may be adopted in which the output timings are made to differ in numerical order in pixel units.

The example of printing shown in FIG. 3 is one in which the image "AB" stored in the image memory 305 is combined, as indicated by the white dots, with the image of the original indicated by the black dots. In this example, the output timings for printing the images to be combined are varied in random fashion.

Further, the invention is not limited to a printing method in which one pixel is printed by jetting ink a plurality of times, as set forth in the foregoing embodiment. For example, a similar image can be obtained even in a printing method such as a sequential multiscanning method in which the image of the original is printed every other pixel and the image is printed by scanning the same band with the printing heads a plurality of times.

Further, in this embodiment, the present invention is described for a case in which image data of a read original and image data stored in an image memory are combined. However, the invention is not limited to this embodiment. For example, it is also possible to combine image data created by a computer and image data already stored. Further, the recording apparatus may have an arrangement not for reading an original but for receiving image data via a communication line or the like and printing the received image data. This data can then be combined with other image data.

Further, it is possible to perform watermarking by combining and printing only one color and not combining other colors.

The present invention provides excellent effects especially in a printing apparatus having an ink jetting printing head of the type in which printing is performed by forming flying droplets utilizing thermal energy.

With regard to a typical configuration and operating principle, it is preferred that the foregoing be achieved using the basic techniques disclosed in the specifications of U.S Pat. Nos. 4,723,129 and 4,740,796. This scheme is applicable to both so-called on-demand-type and continuous-type apparatus. In particular, in the case of the on-demand type, at least one drive signal, which provides a sudden temperature rise that exceeds core boiling and causes film boiling, is applied, in accordance with print information, to an electrothermal transducer arranged to correspond to a sheet or fluid passageway holding a fluid (ink). As a result, thermal energy is produced in the electrothermal transducer to bring about film boiling on the thermal working surface of the printing head. Accordingly, air bubbles can be formed in the fluid (ink) in one-to-one correspondence with the drive signals. A jetting port is made to jet the fluid (ink) by growth and contraction of the air bubbles so as to form at least one droplet. If the drive signal has the form of a pulse, growth and contraction of the air bubbles can be made to take place rapidly and in appropriate fashion. This is preferred since it will be possible to achieve fluid (ink) jetting having excellent response.

Signals described in the specifications of U.S. Pat. Nos. 4,463,359 and 4,345,262 are suitable as drive pulses having this pulse shape. It should be noted that even better printing can be performed by employing the conditions described in the specification of U.S. Pat. No. 4,313,124, which discloses an invention relating to the rate of increase in the temperature of the above-mentioned thermal working surface. In addition to the combination of the jetting port, fluid passageway and electrothermal transducer (in which the fluid passageway is linear or right-angled) disclosed as the construction of the recording head in each of the abovementioned specifications, the present invention also covers an arrangement using the art described in the specifications of U.S. Pat. Nos. 4,558,333 and 4,459,600, which disclose elements disposed in an area in which the thermal working portion is curved.

Further, it is permissible to adopt an arrangement based upon Japanese Patent Application Laid-Open No. 59-123670, which discloses a configuration having a common slot for the jetting portions of a plurality of electrothermal transducers, or Japanese Patent Application Laid-Open No. 59-138461, which discloses a configuration having openings made to correspond to the jetting portions, wherein the openings absorb pressure waves of thermal energy.

As a printing head of the full-line type having a length corresponding to the maximum width of the printing medium capable of being printed on by the printing apparatus, use can be made of an arrangement in which the length is satisfied by a combination of plural printing heads of the kind described in the foregoing specifications, or an arrangement in which printing heads serve as a single integrally formed printing head.

It is permissible to use a freely exchangeable tip-type printing head attached to the main body of the apparatus and capable of being electrically connected to the main body of the apparatus and of supplying ink from the main body, or a cartridge-type recording head in which an ink tank is integrally provided on the printing head itself.

The addition of recovery means for the printing head and spare auxiliary means provided as components of the printing apparatus of the invention is desirable since these stabilize the effects of the invention greatly. Specific examples of these means that can be mentioned are capping means for capping the printing head, cleaning means, pressurizing or suction means, and preheating means such as an electrothermal transducer or another heating element or a combination thereof. Implementing a preliminary jetting mode for performing jetting separately of printing also is effective in order to perform stabilized printing.

The printing mode of the printing apparatus is not limited merely to a printing mode for a mainstream color only, such as the color black. The printing head can have a unitary construction or a plurality of printing heads can be combined. The apparatus can be one having at least one recording mode for a plurality of different colors or for full-color recording using mixed colors.

Further, ink is described as being the fluid in the embodiments of the invention set forth above. The ink used may be one which solidifies at room temperature or lower, or one which softens or liquefies at room temperature. Alternatively, in an ink-jet arrangement, generally the ink is temperature-controlled by regulating the temperature of the ink itself within a temperature range of between 30° C. and 70° C. so that the viscosity of the ink will reside in a region that allows stable jetting of the ink. Therefore, it is permissible to use an ink liquefied when the printing signal is applied.

In order to positively prevent elevated temperature due to thermal energy when this is used as the energy for converting the ink from the solid state to the liquid state, or in order to prevent evaporation of the ink, it is permissible to use an ink which solidifies when left standing. In any case, the present invention is also applicable in a case where use is made of an ink which solidifies in response to application of thermal energy, such as an ink solidified by application of thermal energy conforming to a printing signal or ink which has already begun to solidify at the moment it reaches the recording medium. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

Furthermore, as to the form of the printing apparatus according to the present invention, use is not limited to an image output terminal of an image processing apparatus such as a word processor or computer described above. Other configurations, which may be provided as a separate or integral part, include a copying machine in combination with a reader or the like, a facsimile machine having a transmitting/receiving function, etc.

The present invention can be applied to a system constituted by a plurality of devices or to an apparatus comprising a single device. Furthermore, it goes without saying that the invention is also applicable to a case where the object of the invention is attained by supplying a program to a system or apparatus.

In accordance with this embodiment, as described above, use is made of a multiple-nozzle ink-jet head having a plurality of ink jetting nozzles, and image data applied to the head is changed over each time ink is jetted from the nozzles. As a result, it is possible to simplify the combining of images, such as the combining of a plurality of images or the watermarking of images.

In accordance with the arrangement of the present invention, when two items of image data are combined and printed, it is unnecessary to store the two items of data and further store the combined image data. This makes it possible to print a combined image without providing a large-capacity memory.

Further, in accordance with the present invention, when two items of image data are combined and printed, the image data applied to the head is changed over and printed. As a result, images can be combined without rewriting the two items of image data prior to their combination, and it is easy to select at will between printing of the combined image and printing without combining images.

As many apparently widely different embodiments of the present invention can be made without departing from the spirit and scope thereof, it is to be understood that the invention is not limited to the specific embodiments thereof except as defined in the appended claims.

What is claimed is:

1. An image printing apparatus for printing an image on a recording medium by driving a recording head in accordance with image data, comprising:
    storage means for storing first image data;
    input means for inputting second image data having multivalued pixel data;
    print control means for dividing a print timing for printing at least one pixel corresponding to the image data into a plurality of time intervals for each pixel, assigning a predetermined time interval of the plurality of time intervals for printing a pixel of the first image data, driving the recording head during at least one time interval to form one pixel on the recording medium, and determining a number of time intervals to be assigned for printing a pixel of the second image data in accordance with a tonality of the pixel of the second image data; and
    switching means for outputting to said recording head, when first and second image data are assigned to a single pixel to drive the recording head during at least one common time interval, the first image data at the predetermined time interval, and the second image data at time intervals other than the predetermined time interval.

2. The apparatus according to claim 1, further comprising converting means for converting an original image into image data, wherein said second image data is the image data converted by said converting means.

3. The apparatus according to claim 2, further comprising converting means for reading the original image photo-electrically and converting the read image data into said second image data.

4. The apparatus according to claim 3, wherein said print control means operates in synchronism with the reading operation of said converting means.

5. The apparatus according to claim 2, wherein said print control means operates in synchronism with the converting operation of said converting means.

6. The apparatus according to claim 1, wherein said switching means switches said predetermined time interval for each of the pixels of the second image data.

7. The apparatus according to claim 1, wherein said switching means randomly changes said predetermined time interval for each of the pixels of the second image data.

8. The apparatus according to claim 1, wherein said recording head has a plurality of printing elements, and said switching means switches said first and second image data for each printing element and outputs said first or second image data.

9. The apparatus according to claim 1, wherein said image data is half-tone image data, and said print control means prints a multitone image by controlling the number of driving times of said recording head in accordance with a degree of tone of each pixel in said image data.

10. The apparatus according to claim 1, further comprising a plurality of said recording heads, wherein each of said plurality of said recording heads prints a corresponding color image and a multicolored image is printed by said plurality of said recording heads.

11. The apparatus according to claim 1, said recording head has a plurality of outlets to jet ink and jetting means for jetting ink from said outlet.

12. The apparatus according to claim 11, wherein said jetting means creates a change of state in ink, including growth of air bubbles by adding heat energy, and at least one ink drop is jetted by means of the change of status.

13. An image printing apparatus for printing an image on a recording medium by driving a recording head in accordance with image data, said apparatus comprising:
    memory means for storing first image data;
    input means for inputting second image data;
    printing means for printing a pixel of a tonal image by driving the recording head during at least one of a plurality of divided time intervals;
    selecting means for selecting one of the first image data or the second image data to be printed in the pixel during a time interval in which print timings of the first image data and the second image data are assigned to the same time interval, in synchronism with each of the plurality of time intervals, based on priority information regarding which image data to print; and print control means for driving said printing means to form an image on the recording medium based on the first image data or the second image data selected by said selecting means to record the pixel.

14. The apparatus according to claim 1, wherein said input means inputs the second image data, which is generated from an original image.

* * * * *

UNITED STATES PATENT AND TRADEMARK OFFICE
CERTIFICATE OF CORRECTION

PATENT NO. : 5,844,590

DATED : December 1, 1998

INVENTOR(S) : KIYOHISA SUGISHIMA

It is certified that error appears in the above-identified patent and that said Letters Patent is hereby corrected as shown below:

TITLE [54]

"ELECTIVE" should read --SELECTIVE--.

References cited [56]

U.S. PATENT DOCUMENTS

"4,345,265  8/1982 should read -- 4,345,262  8/1982--.

COLUMN 1

Title

"ELECTIVE" should read --SELECTIVE--.

COLUMN 2

Line 20, "construction, of" should read --construction of--.

UNITED STATES PATENT AND TRADEMARK OFFICE
CERTIFICATE OF CORRECTION

PATENT NO. : 5,844,590

DATED : December 1, 1998

INVENTOR(S) : KIYOHISA SUGISHIMA

It is certified that error appears in the above-identified patent and that said Letters Patent is hereby corrected as shown below:

COLUMN 5

Line 8, "also" should be deleted.

Signed and Sealed this

Tenth Day of October, 2000

Attest:

Q. TODD DICKINSON

Attesting Officer

Director of Patents and Trademarks